United States Patent
Dronamraju et al.

(10) Patent No.: US 11,409,448 B2
(45) Date of Patent: *Aug. 9, 2022

(54) SELECTIVELY STORING DATA INTO ALLOCATION AREAS USING STREAMS

(71) Applicant: NetApp Inc., Sunnyvale, CA (US)

(72) Inventors: Ravikanth Dronamraju, Pleasanton, CA (US); Kyle Diggs Sterling, San Francisco, CA (US); Mrinal K. Bhattacharjee, Karnataka (IN); Mohit Gupta, San Jose, CA (US)

(73) Assignee: NetApp Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,448

(22) Filed: Jul. 28, 2020

(65) Prior Publication Data

US 2020/0356288 A1 Nov. 12, 2020

Related U.S. Application Data

(63) Continuation of application No. 15/453,949, filed on Mar. 9, 2017, now Pat. No. 10,761,750.

(51) Int. Cl.
*G06F 12/00* (2006.01)
*G06F 3/06* (2006.01)
(Continued)

(52) U.S. Cl.
CPC .......... *G06F 3/0631* (2013.01); *G06F 3/0605* (2013.01); *G06F 3/068* (2013.01);
(Continued)

(58) Field of Classification Search
CPC .... G06F 3/0631; G06F 3/0626; G06F 3/0685; G06F 3/0605; G06F 3/0644; G06F 3/068;
(Continued)

(56) References Cited

U.S. PATENT DOCUMENTS 7,853,759 B2 12/2010 Sadovsky et al.
8,074,043 B1 * 12/2011 Zeis .................... G06F 16/1748
711/171

(Continued)

FOREIGN PATENT DOCUMENTS

WO 2008134165 A1 11/2008

OTHER PUBLICATIONS

International Search Report and Written Opinion for PCT Application No. PCT/US2018/021659 dated Jun. 11, 2018, 14 pages.

*Primary Examiner* — John A Lane
(74) *Attorney, Agent, or Firm* — Cooper Legal Group, LLC (57) ABSTRACT

Techniques are provided for selectively storing data into allocation areas using streams. A set of allocation areas (e.g., ranges of block numbers such as virtual block numbers) are defined for a storage device. Data having particular characteristics (e.g., user data, metadata, hot data, cold data, randomly accessed data, sequentially accessed data, etc.) will be sent to the storage device for selective storage in corresponding allocation areas. For example, when a file system receives a write stream of hot data, the hot data may be assigned to a stream. The stream will be tagged using a stream identifier that is used as an indicator to the storage device to process data of the stream using an allocation area defined for hot data. In this way, data having different characteristics will be stored/confined within particular allocation areas of the storage device to reduce fragmentation and write amplification.

20 Claims, 8 Drawing Sheets

(51) Int. Cl.
*H04L 65/61* (2022.01)
*H04L 67/1097* (2022.01)

(52) U.S. Cl.
CPC .......... *G06F 3/0626* (2013.01); *G06F 3/0644* (2013.01); *G06F 3/0685* (2013.01); *G06F 3/0689* (2013.01); *H04L 65/4069* (2013.01); *H04L 67/1097* (2013.01)

(58) Field of Classification Search
CPC .............. G06F 3/0689; H04L 65/4069; H04L 67/1097
See application file for complete search history.

(56) References Cited

U.S. PATENT DOCUMENTS

| | | | |
|---|---|---|---|
| 8,751,725 B1 | 6/2014 | Gangadharan et al. | |
| 8,959,284 B1 | 2/2015 | Boyle et al. | |
| 9,904,480 B1* | 2/2018 | Singh | G06F 3/0619 |
| 10,956,082 B1* | 3/2021 | Chen | G06F 3/0679 |
| 2011/0107042 A1 | 5/2011 | Herron | |
| 2013/0185488 A1* | 7/2013 | Talagala | G06F 12/0246 |
| | | | 711/103 |
| 2014/0095734 A1* | 4/2014 | Chan | H04M 1/72412 |
| | | | 709/248 |
| 2016/0048355 A1* | 2/2016 | Iliadis | G06F 3/0649 |
| | | | 711/171 |
| 2016/0196086 A1* | 7/2016 | Baskaran | G06F 3/0604 |
| | | | 711/170 |
| 2016/0313943 A1 | 10/2016 | Hashimoto et al. | |
| 2017/0242788 A1 | 8/2017 | Ahmed et al. | |
| 2017/0374147 A1 | 12/2017 | McNair et al. | |
| 2018/0059988 A1 | 3/2018 | Shivanand et al. | |
| 2018/0124157 A1* | 5/2018 | Gao | G06F 3/0665 |
| 2018/0276118 A1 | 9/2018 | Yanagida | |
| 2018/0307596 A1 | 10/2018 | Pandurangan et al. | |
| 2018/0307598 A1 | 10/2018 | Fischer et al. | |
| 2019/0065058 A1* | 2/2019 | Camp | G06F 3/064 |
| 2019/0155690 A1* | 5/2019 | Baptist | H03M 13/3761 |

\* cited by examiner

SELECTIVELY STORING DATA INTO ALLOCATION AREAS USING STREAMS

RELATED APPLICATIONS

This application claims priority to and is a continuation of U.S. application Ser. No. 15/453,949, filed on Mar. 9, 2017, now allowed, titled "SELECTIVELY STORING DATA INTO ALLOCATION AREAS USING STREAMS," which is incorporated herein by reference.

BACKGROUND

Many file systems of storage controllers can receive data through multiple channels associated with various protocols. A file system may store that data within a storage device or across multiple storage devices. Such data may have various characteristics, such as being user data (e.g., a user database file) or metadata (e.g., a volume size of a volume, a network address of a storage controller, a replication policy, and/or other data used by the file system and/or storage controller), for example. In another example, the characteristics can correspond to hot data (e.g., data that is being accessed above a threshold frequency, such as metadata that is being frequently modified by the file system) or cold data (e.g., user data that is being accessed below the threshold frequency). In another example, the characteristics can correspond to sequentially accessed data (e.g., data stored within contiguous blocks) or randomly accessed data (e.g., data stored within blocks that are not contiguous).

A virtualization layer can be used as an indirection layer that groups together physical storage from multiple storage devices into what appears to be a single storage object to clients and applications (e.g., a volume or logical unit number (LUN) may span multiple physical storage devices). The virtualization layer abstracts away the physical layout of storage, and thus operates in a logical address space that is mapped to the underlying physical address space. With virtualized storage, the storage device may assume the role of physically storing data within physical blocks of the storage device in locations chosen by the storage device. However, the storage device may store any type of data, such as hot data, cold data, user data, and metadata together without any logical/physical separation. Unfortunately, data with different characteristics may have different access and overwrite patterns, and thus fragmentation can result when such data is store together.

In an example, a solid state drive (SSD) may not have the capability to overwrite a previously written block, and can only write to empty destination cells. Thus, if a destination cell has data that is to be reused, then the data may be moved to different empty cell and the destination cell must be reprogrammed (e.g., erased) so that new data can be written to the destination cell. This results in increased fragmentation, which becomes more pronounced when data of different characteristics is stored together. The storage device can reserve space to provide for background garbage collection that can proactively free cells. However, a substantial amount of storage space may be reserved such as about 28% or any other percentage of storage of the storage device. This leads to inefficient usage of storage resources and increased cost due to over-provisioning. Also, write amplification becomes problematic on subsequent overwrites, which can lead to degraded performance and wear on the storage device.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for selectively storing data into allocation areas using streams are provided herein.

A storage device may be used by a virtualization layer to provide virtualized storage to clients (e.g., the virtualization layer may hide the underlying details of physical storage, and may group physical storage of multiple physical devices into a single storage object exposed to clients and applications). If the storage device does not have a well-defined mapping of logical address space to physical address space, then the storage device will merely store any type of data together. Storing different types of data together overtime (e.g., data having different access frequencies, data having different overwrite patterns and frequencies, data of different aggregates, randomly accessed data, sequentially accessed data, hot data, cold data, user data, metadata, etc.) can result in fragmentation of the storage device. Write amplification will also result on subsequent overwrites. Also, certain types of storage devices such as a solid state drive over-provision storage (e.g., reserve a percentage of otherwise free storage) for use by garbage collection functionality to proactively free cells of solid state drives. Such overprovisioning wastes storage space that could otherwise we used to store user data and/or metadata. Thus, there is a need to reduce fragmentation, reduce write amplification, and improve storage efficiency of storage space.

Accordingly, as provided herein, data of a write stream is assigned to different streams based upon characteristics of such data. In particular, frequently accessed data may be assigned to a first stream, infrequently accessed data may be assigned to a second stream, randomly accessed data may be assigned to a third stream, sequentially accessed data may be assigned to a fourth stream, etc. based upon one or more policies specifying that data with different characteristics is to be stored in different allocation areas of a storage device (e.g., within different physical address ranges or virtual block numbers of the storage device).

The policy and the assignment of data to streams may be implemented by a file system so that data can be stored in separate locations within the storage device even if storage of the storage device is virtualized and/or the storage device does not maintain a well-defined mapping of logical address space to physical address space and thus would otherwise just store all data together or without any discernment. Each stream may be tagged with a particular stream identifier assigned by the policy to a corresponding allocation area. For example, the policy may specify that frequently accessed data is to be stored in an allocation area (C), and thus the first stream of frequently accessed data is tagged with a stream identifier that is used as an indicator to the storage device that data of the first stream is to be processed (e.g., stored within) using the allocation area (C). Storing data with similar characteristics together in the same allocation area and storing data with dissimilar characters in separate allocation areas will reduce fragmentation and write amplification for the overall storage device (e.g., frequently overwritten data can be contained within a single allocation area as opposed to be spread across the entire storage device such that fragmentation from overwrites will not affect the entire storage device, otherwise, fragmentation would result across the entire storage device especially for a write anywhere file system that writes data to new locations for any write operation). This also improves storage efficiency because a background garbage collection process may not be needed or may use a much smaller reserved area of the storage device for garbage collecting.

Figure 1:
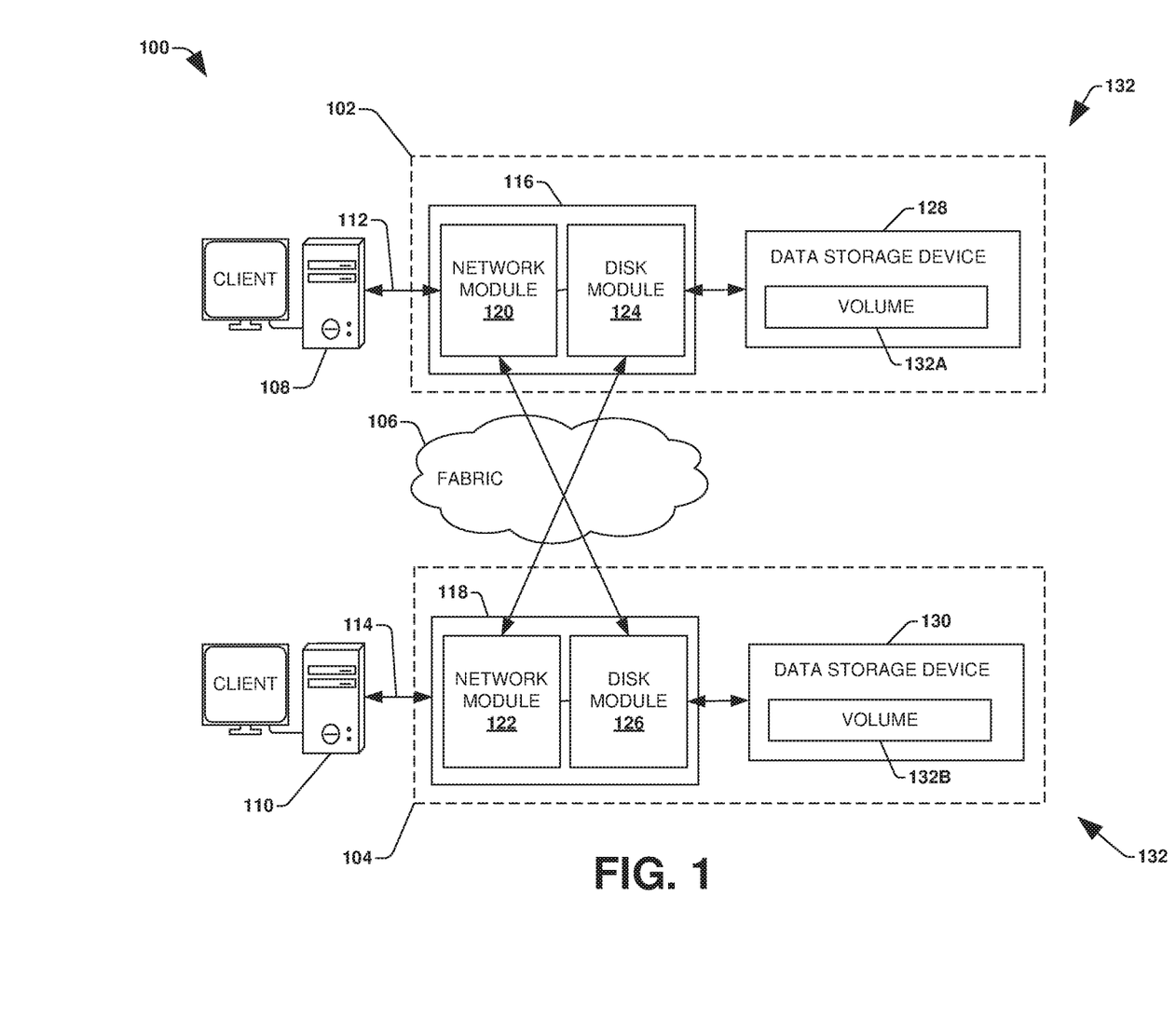
FIG. 1 is a component block diagram illustrating an example clustered network in accordance with one or more of the provisions set forth herein.

To provide for selectively storing data into allocation areas using streams, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that selectively storing data into allocation areas using streams may be implemented within the clustered network environment 100. In an example, allocation areas may be defined within the data storage device 128 and/or the data storage device 130. Data may be selectively sent through streams to the data storage device 128 and/or the data storage device 130. The streams may be tagged with stream identifiers corresponding to allocation areas from which such streams are to be processed. It may be appreciated that selectively storing data into allocation areas using streams may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
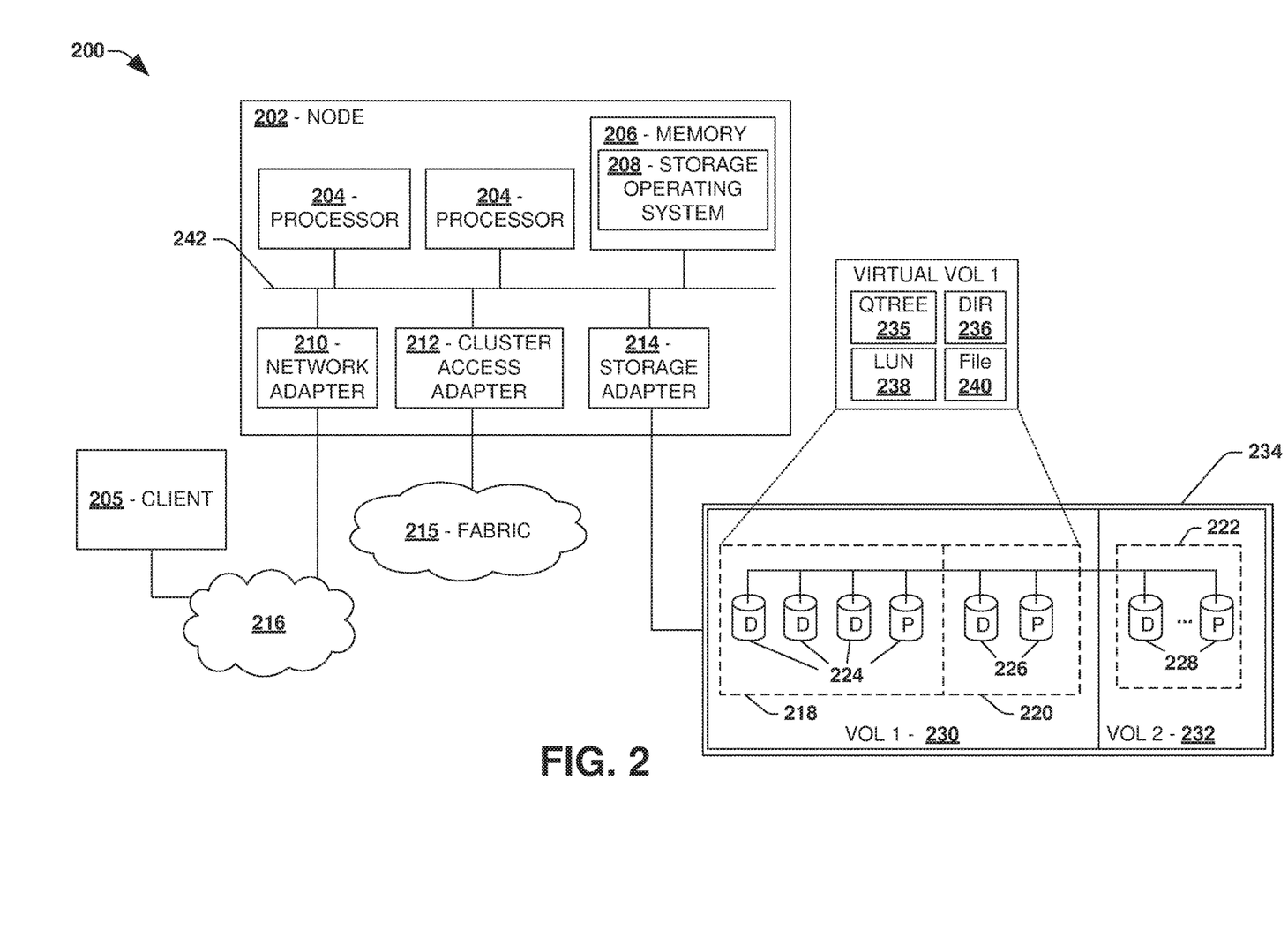
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that selectively storing data into allocation areas using streams may be implemented for the data storage system 200. In an example, allocation areas may be defined within the one or more data storage devices 234. Data may be selectively sent through streams to the one or more data storage devices 234. The streams may be tagged with stream identifiers corresponding to allocation areas from which such streams are to be processed. It may be appreciated that selectively storing data into allocation areas using streams may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
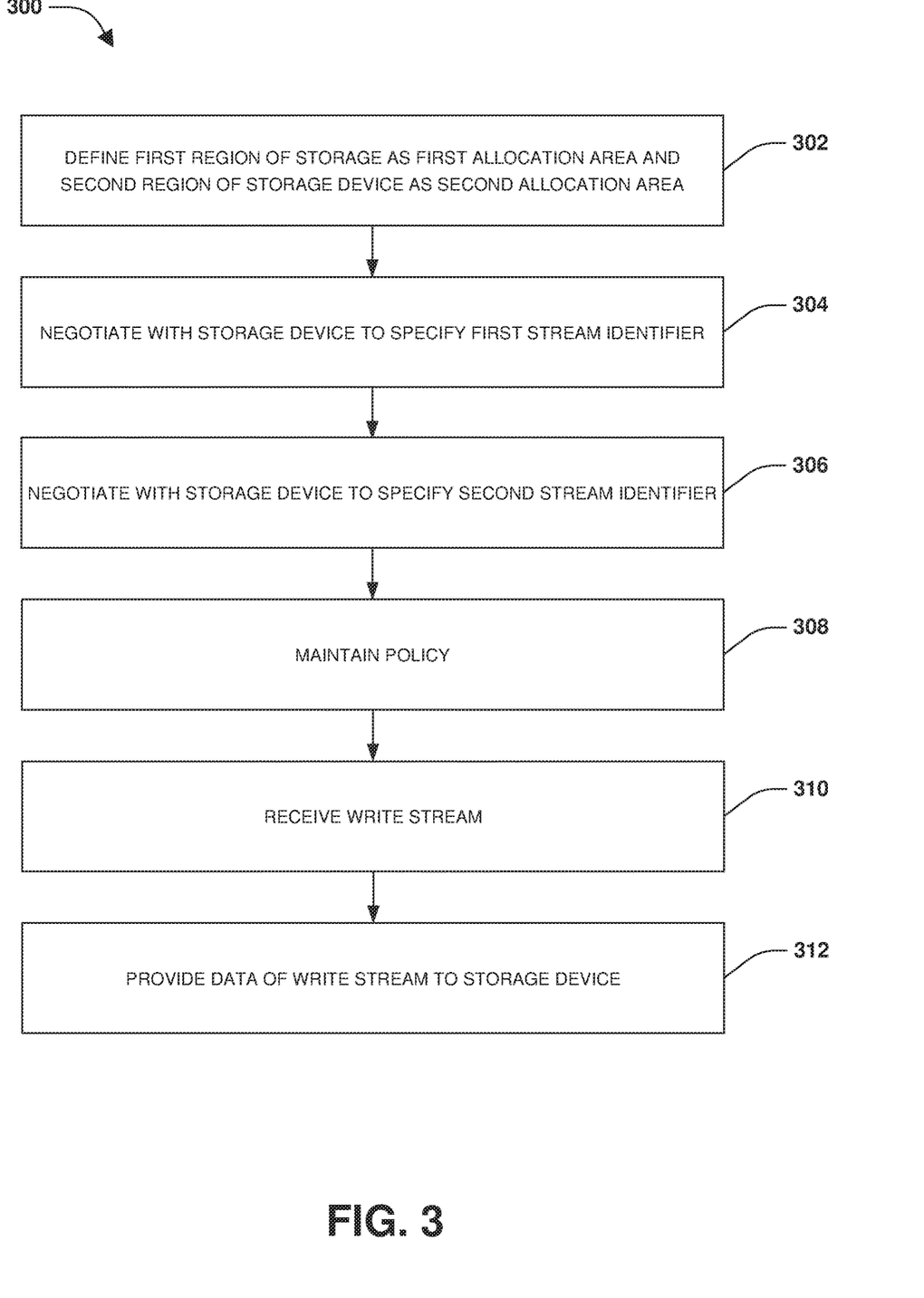
FIG. 3 is a flow chart illustrating an exemplary method of selectively storing data into allocation areas using streams.

One embodiment of selectively storing data into allocation areas using streams is illustrated by an exemplary method 300 of FIG. 3. At 302, a first region of a storage device may be defined as a first allocation area. A second region of the storage device may be defined as a second allocation area. It may be appreciated that any number of allocation areas may be defined for the storage device and/or that a single allocation area may span across any number and types of storage devices (e.g., an allocation area spanning a first portion of first storage media, a second portion of second storage media, etc.; an allocation area spanning a first disk, a second disk, and a parity disk of a RAID configuration; etc.). The storage device may comprise any type of storage device, such as a solid state device, a flash device, a partitioned storage device, a storage device lacking a straight forward mapping of a logical address space to a physical address space, a storage device used by an indirection layer such as a virtualization layer that virtualizes storage of the storage device, etc. In an example, allocation areas may be defined as integer multiples of erase block units of the storage device, such as of a solid state device (e.g., data is written to flash memory in page units comprised of multiple cells, and the flash memory can only be erased in larger units referred to as block units comprised of multiple page units).

At 304, a negotiation may be facilitated with the storage device (e.g., by a file system) to specify that a first stream identifier will be used as a first indicator for the storage device to indicate that streams tagged with the first stream identifier are to be processed using the first allocation area (e.g., data of a stream tagged with the first stream identifier is to be stored within the first allocation area by the storage device and not stored within other allocation areas). At 306, a negotiation may be facilitated with the storage device (e.g., by the file system) to specify that a second stream identifier will be used as a second indicator for the storage device to indicate that streams tagged with the second stream identifier are to be processed using the second allocation area. In this way, the storage device will agree to process streams using allocation areas corresponding to stream identifiers used to tag such streams by the file system.

At 308, a policy, specifying that data with certain characteristics are to be processed using certain allocation areas, may be maintained. For example, the policy may specify that data with a first characteristic is to be processed using the first allocation area (e.g., such data is to be stored and read from the first allocation area) and that data with a second characteristic is to be processed using the second allocation area (e.g., such data is to be stored and read from the second allocation area). It may be appreciated that a single policy may be specified for a single characteristic or for multiple characteristics (e.g., the policy specifies where to store hot data, where to store cold data, where to store randomly accessed data, where to store sequentially accessed data) and/or that one or more policies may be specified for individual characteristics or pairings of characteristics (e.g., a first policy for hot data and cold data, a second policy for user data and metadata, etc.). Policies may be assigned to allocation areas for which such policies are to apply. Policies may specify stream identifiers for allocation areas for which such policies are to apply.

In an example, the first characteristic may correspond to a user data characteristic and the second characteristic may correspond to a metadata characteristic (e.g., metadata may be overwritten more frequently than user data, and thus has a different access pattern and should be stored separately). In another example, the first characteristic may correspond to a first data frequency access characteristic and the second characteristic may correspond to a second data frequency access characteristic (e.g., more frequently accessed data such as hot data may be stored within a different allocation area than less frequently accessed data such as cold data). In another example, the first characteristic may correspond to a sequential access characteristic and the second characteristic may correspond to a random access characteristic (e.g., sequentially accessed data may be stored within a different allocation area than randomly accessed data). In another example, the first characteristic may correspond to a first storage aggregate characteristic and the second characteristic may correspond to a second storage aggregate characteristic (e.g., data of a first storage aggregate provided to a first client may be stored within a different allocation area than data of a second storage aggregate provided to a second client). It may be appreciated that a variety of other characteristics may be defined within the policy.

In an example, a set of allocation areas are defined for the storage device. Policies may be assigned to allocation areas of the set of allocation areas. The set of allocation areas are dynamically sorted (e.g., sorted and/or resorted on-the-fly as write streams are received by the file system for processing) as a sorted set of allocation areas based upon the policies, amounts of available free space of each allocation area, and/or other sorting criteria (e.g., if user data can be stored within the first allocation area and a fifth allocation area, then the allocation area with more available storage space may be ranked higher and thus used). The set of policies are used to assign data to streams based upon characteristics of the data. The set of policies are also used to tag streams with appropriate stream identifiers (e.g., a policy may indicate that metadata is to be stored within a third allocation area, and thus the policy is used to assign metadata of a write stream into a stream and the policy is used to tag the stream with a stream identifier of the third allocation area).

At 310, a write stream of data to write to the storage device is received. In an example, a file system receives the write stream. Characteristics of the data may be identified, such as user data, metadata, and/or other types of data such as randomly accessed data. The sorted set of allocation areas may be evaluated to identify allocation areas that are to be used to process the user data and the metadata. For example, a policy may specify that a first allocation area and/or other allocation areas are to be used for processing user data. The policy or a different policy may specify that a second allocation area and/or other allocation areas are to be used for processing metadata. Accordingly, a target allocation area may be selected from the sorted set of allocation areas for storing the user data based upon the target allocation area having a sorted rank above a threshold in relation to user data (e.g., a highest rank of allocation areas that can be used for storing user data, such as the first allocation area). A target allocation area may be selected from the sorted set of allocation areas for storing the metadata based upon the target allocation area having a sorted rank above the threshold in relation to metadata (e.g., a highest rank of allocation areas that can be used for storing metadata, such as the second allocation area).

At 312, data of the write stream may be provided to the storage device through streams tagged with stream identifiers of corresponding allocation areas. For example, the user data may be assigned to a first stream. The first stream may be tagged with the first stream identifier for the first allocation area that is to be used for processing user data. In this way, when the storage device receives the first stream, the storage device will know to process the user data of the first stream using the first allocation area based upon the first stream identifier. The metadata may be assigned to a second stream. The second stream may be tagged with the second stream identifier for the second allocation area that is to be used for processing metadata. In this way, when the storage device receives the second stream, the storage device will know to process the metadata of the second stream using the second allocation area based upon the second stream identifier.

An allocation area may be determined to have an amount of free space below a threshold. In an example, a policy for the allocation area can be terminated (e.g., automatically terminated or a suggestion may be provided to a storage administrator for terminating the policy). In another example, the allocation area may be redefined to increase the amount of free space, and the policy may be retained for the allocation area.

Selectively storing similar types of data together and storing dissimilar types of data in separate allocation areas will reduce fragmentation, reduce write amplification, and increase storage efficiency.

Figure 4:
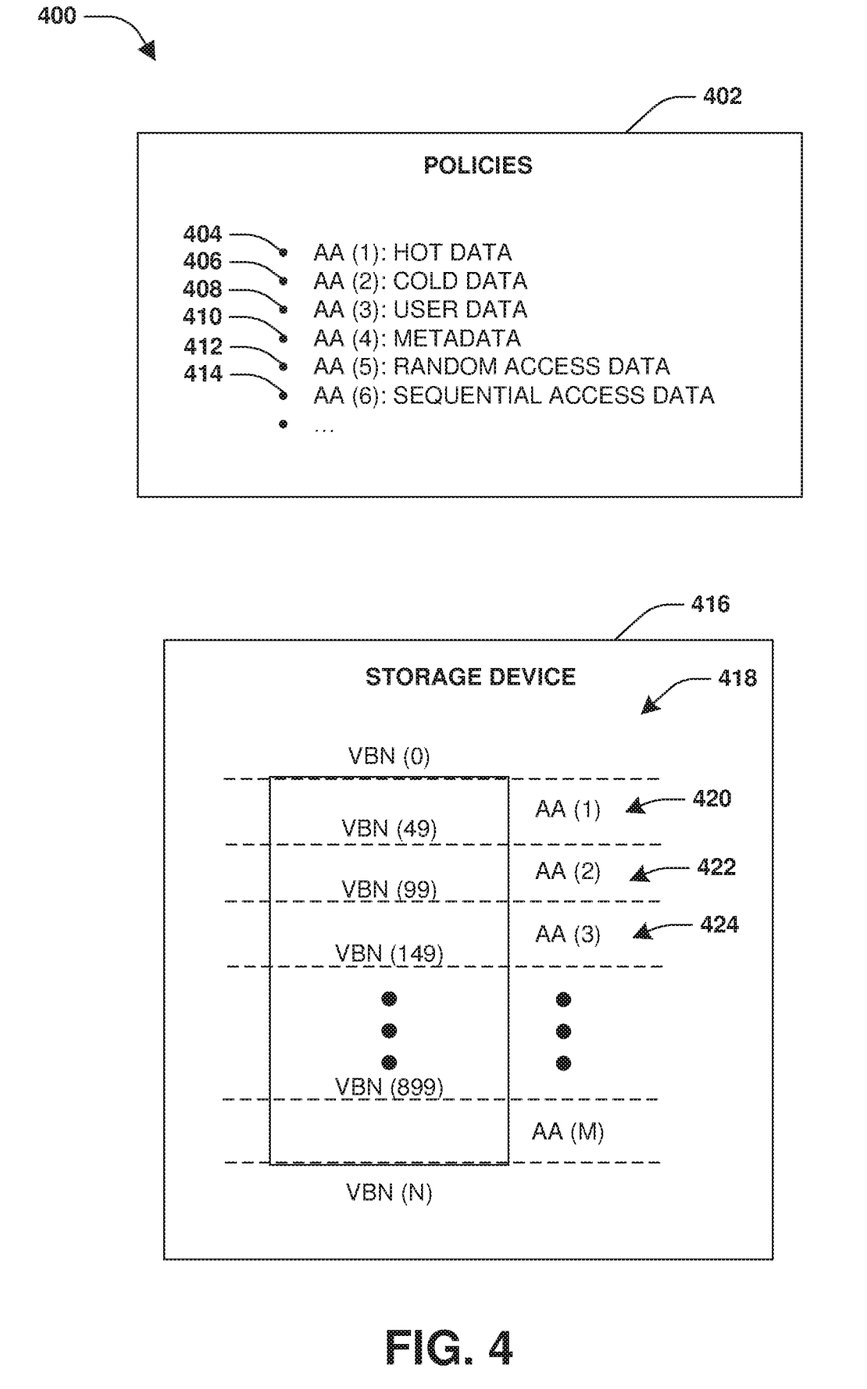
FIG. 4 is a component block diagram illustrating an exemplary computing device for selectively storing data into allocation areas using streams, where allocation areas are defined and policies are assigned to allocation areas.

FIG. 4 illustrates an example of a system 400 for selectively storing data into allocation areas using streams. A set of allocation areas may be defined for a storage device 416, such as for storage media 418 of the storage device 416. For example, a first allocation area 420 may be defined as encompassing a first block range such as from a virtual block number (0) to a virtual block number (49). A second allocation area 422 may be defined as encompassing a second block range such as from a virtual block number (50) to a virtual block number (99). A third allocation area 424 may be defined as encompassing a third block range such as from a virtual block number (100) to a virtual block number (149). It may be appreciated that allocation areas may have the same or different sizes as one another and that the entire storage space or merely a portion of the storage space of the storage device 416 may be used for defining allocation areas. In this way, any number of allocation areas may be defined for the storage device 416.

Policies 402 may be assigned to allocation areas. In an example, a first policy 404 may be assigned to the first allocation area 420 and/or other allocation areas. The first policy 404 may specify that hot data (e.g., data that is accessed above a threshold frequency) is to be stored within the first allocation area 420 and/or the other allocation areas. A second policy 406 may be assigned to the second allocation area 422 and/or other allocation areas. The second policy 406 may specify that cold data (e.g., data that is accessed below the threshold frequency) is to be stored within the second allocation area 422 and/or the other allocation areas.

A third policy 408 may be assigned to the third allocation area 424 and/or other allocation areas. The third policy 408 may specify that user data (e.g., a user text document) is to be stored within the third allocation area 424 and/or the other allocation areas. A fourth policy 410 may be assigned to a fourth allocation area and/or other allocation areas. The fourth policy 410 may specify that metadata (e.g., metadata maintained by a storage file system, such as volume size information, partner storage controller information, replication policy information, backup policies, etc.) is to be stored within a fourth allocation area and/or the other allocation areas.

A fifth policy 412 may be assigned to a fifth allocation area and/or other allocation areas. The fifth policy 412 may specify that randomly access data is to be stored within a fifth allocation area and/or the other allocation areas. A sixth policy 414 may be assigned to a sixth allocation area and/or other allocation areas. The sixth policy 414 may specify that sequentially accessed data is to be stored within a sixth allocation area and/or the other allocation areas.

A seventh policy may be assigned to a seventh allocation area and/or other allocation areas. The seventh policy may specify that data of a first aggregate is to be stored within a seventh allocation area and/or the other allocation areas. An eighth policy may be assigned to an eighth allocation area and/or other allocation areas. The eighth policy may specify that data of a second aggregate is to be stored within an eighth allocation area and/or the other allocation areas.

It may be appreciated that any number of policies may be assigned to a single allocation area (e.g., a ninth policy specifying that hot data can be stored within a seventh allocation area and an tenth policy specifying that metadata can be stored within the seventh allocation area), and that a policy may be assigned to more than one allocation area (e.g., a policy specify that hot data can be stored within the first allocation area 420, the seventh allocation area, and a ninth allocation area). It may also be appreciated that a policy may apply to a single classification of data (e.g., hot data) or may apply to multiple classifications of data (e.g., a policy specifying where to store hot data, where to store cold data, where to store user data, etc.).

Figure 5:
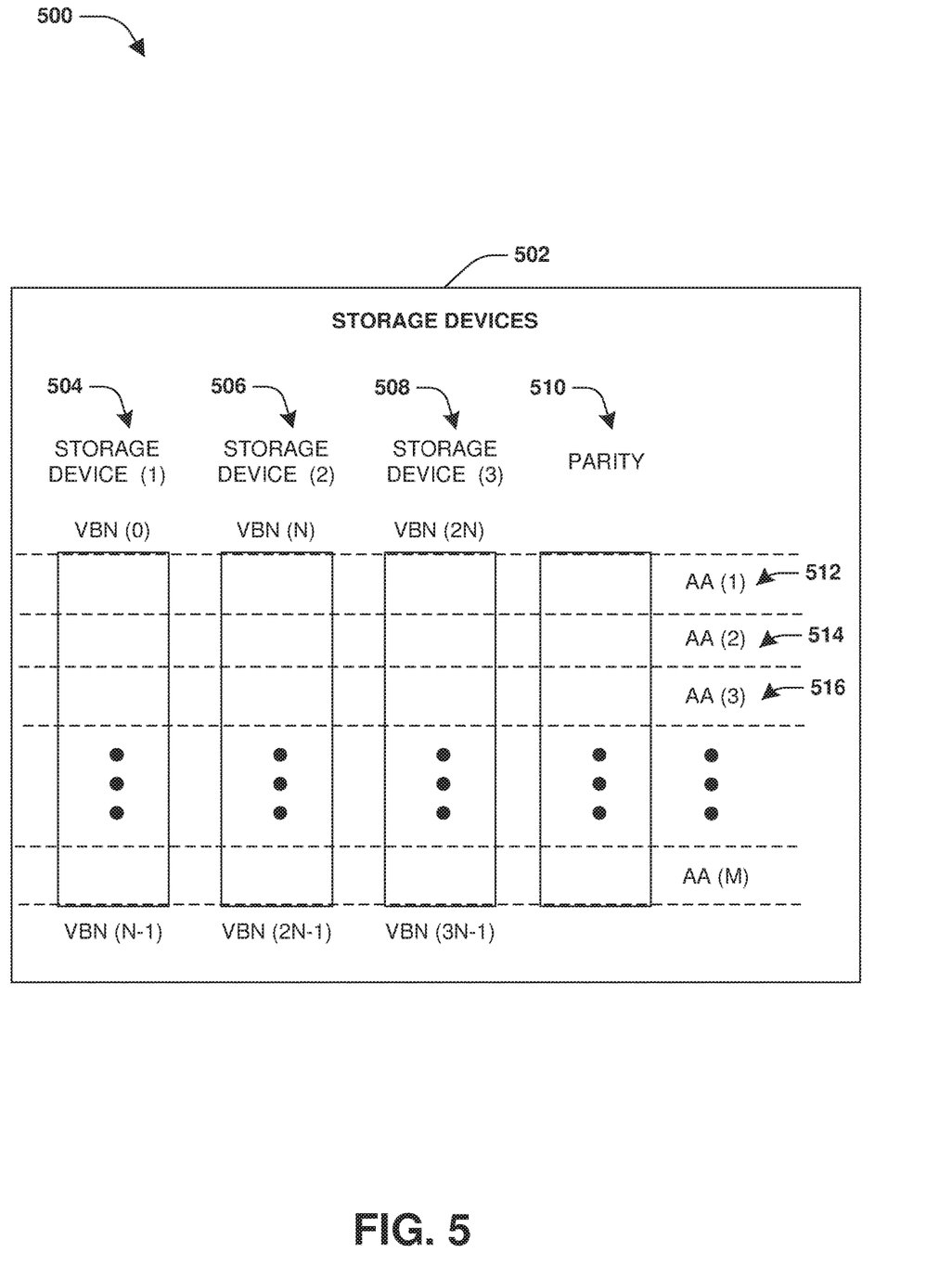
FIG. 5 is a component block diagram illustrating an exemplary computing device for selectively storing data into allocation areas using streams, where allocation areas are defined across multiple storage devices.

FIG. 5 illustrates an example of a system 500 for selectively storing data into allocation areas using streams. Allocation areas may be defined across multiple storage devices 502. For example, a first allocation area 512 may be defined across first portions of a first storage device 504, a second storage device 506, a third storage device 508, a parity storage device 510, and/or other storage devices (e.g., storage devices having a RAID configuration). In this way, data, within a stream that is tagged with a stream identifier associated with the first allocation area 512, may be stored within the first allocation area 512 such as stored across one or more of the first storage device 504, the second storage device 506, the third storage device 508, and/or the parity storage device 510.

A second allocation area 514 may be defined across second portions of the first storage device 504, the second storage device 506, the third storage device 508, the parity storage device 510, and/or other storage devices. In this way, data, within a stream that is tagged with a stream identifier associated with the second allocation area 514, may be stored within the second allocation area 514 such as stored across one or more of the first storage device 504, the second storage device 506, the third storage device 508, and/or the parity storage device 510.

A third allocation area 516 may be defined across third portions of the first storage device 504, the second storage device 506, the third storage device 508, the parity storage device 510, and/or other storage devices. In this way, data, within a stream that is tagged with a stream identifier associated with the third allocation area 516, may be stored within the third allocation area 516 such as stored across one or more of the first storage device 504, the second storage device 506, the third storage device 508, and/or the parity storage device 510.

It may be appreciated that any number of allocation areas may be defined for a single storage device or across any number of storage devices. It also may be appreciated that an allocation area may be defined within a single storage device or across any number of storage devices.

Figure 6:
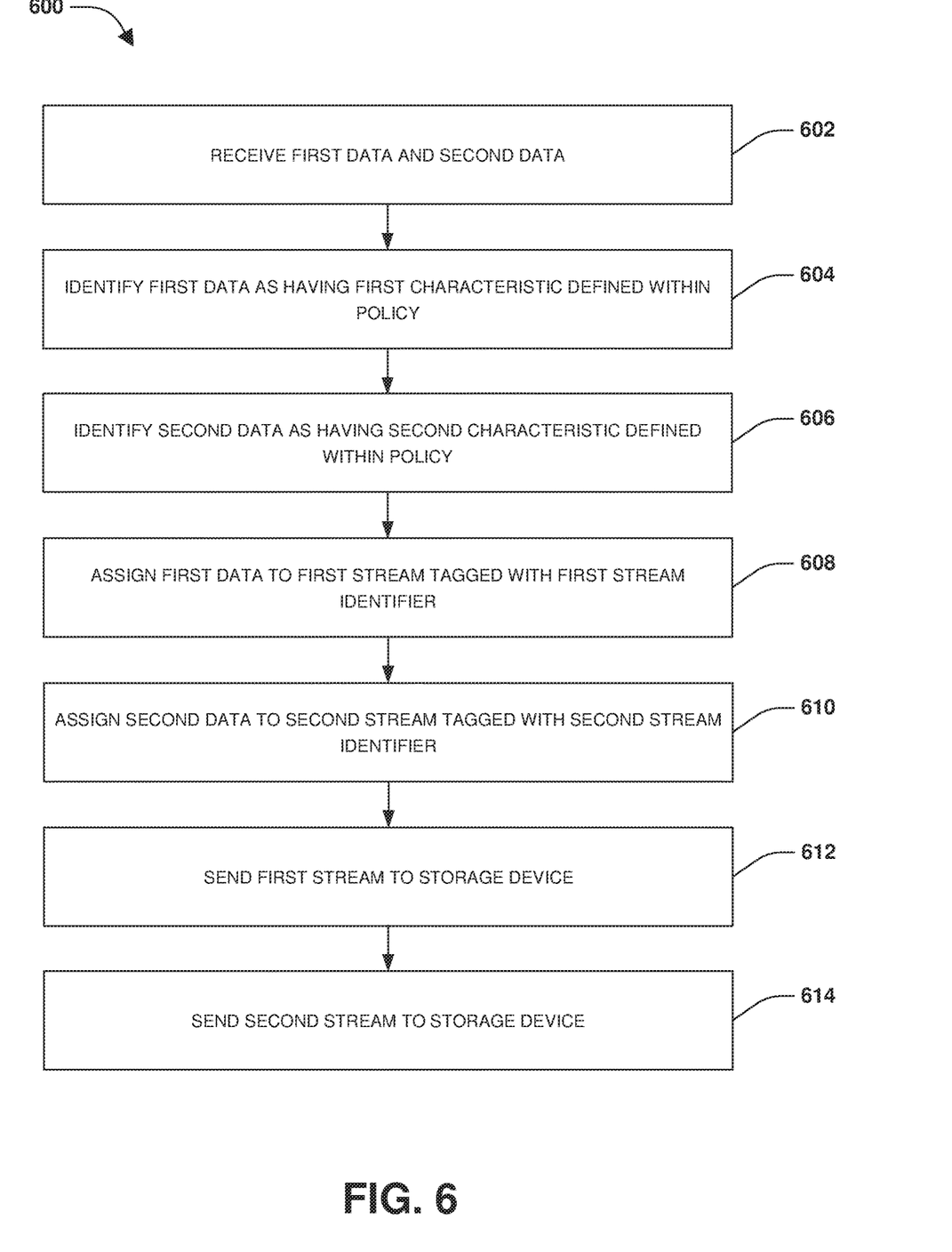
FIG. 6 is a flow chart illustrating an exemplary method of selectively storing data into allocation areas using streams.

One embodiment of selectively storing data into allocation areas using streams is illustrated by an exemplary method 600 of FIG. 6. At 602, first data and second data may be received. For example, a file system of a storage controller may receive a write stream comprising the first data and the second data from client applications. In an example, the file system may be associated with an indirection layer, such as a virtualization layer that virtualizes data of a storage device into which the first data and the second data are to be written.

A policy may define a first characteristic as a user data characteristic, a second characteristic as a metadata characteristic, a third characteristic as a hot data characteristic, a fourth characteristic of a cold data characteristic, etc. At 604, the first data may be identified as having the first characteristic defined within a policy (e.g., the first data is user data in a user database). At 606, the second data may be identified as having the second characteristic defined within the policy (e.g., the second data is metadata used by a storage controller to manage replication of the user database). In this way, the first data may be identified as user data and the second data may be identified as metadata.

At 608, the first data is assigned to a first stream. The first stream is tagged with a first stream identifier specified by the policy for the first characteristic of user data. The first stream identifier is associated with a first allocation area, of the storage device, that is defined by the policy for storing user data (e.g., the file system and the storage device may have negotiated to determine that the first stream identifier would be used to tag streams of user data that is to be processed using the first allocation area).

At 610, the second data is assigned to a second stream. The second stream is tagged with a second stream identifier specified by the policy for the second characteristic of metadata. The second stream identifier is associated with a second allocation area, of the storage device, that is defined by the policy for storing metadata (e.g., the file system and the storage device may have negotiated to determine that the second stream identifier would be used to tag streams of metadata that is to be processed using the second allocation area).

At 612, the first stream is sent to the storage device for writing the first data of user data to the first allocation area based upon the first stream being tagged with the first stream identifier. In this way, user data may be selectively stored within the first allocation area and not in other allocation area that are not designated for user data.

At 614, the second stream is sent to the storage device for writing the second data of metadata to the second allocation area based upon the second stream being tagged with the second stream identifier. In this way, metadata may be selectively stored within the second allocation area and not in other allocation areas that are not designated for metadata.

Figure 7:
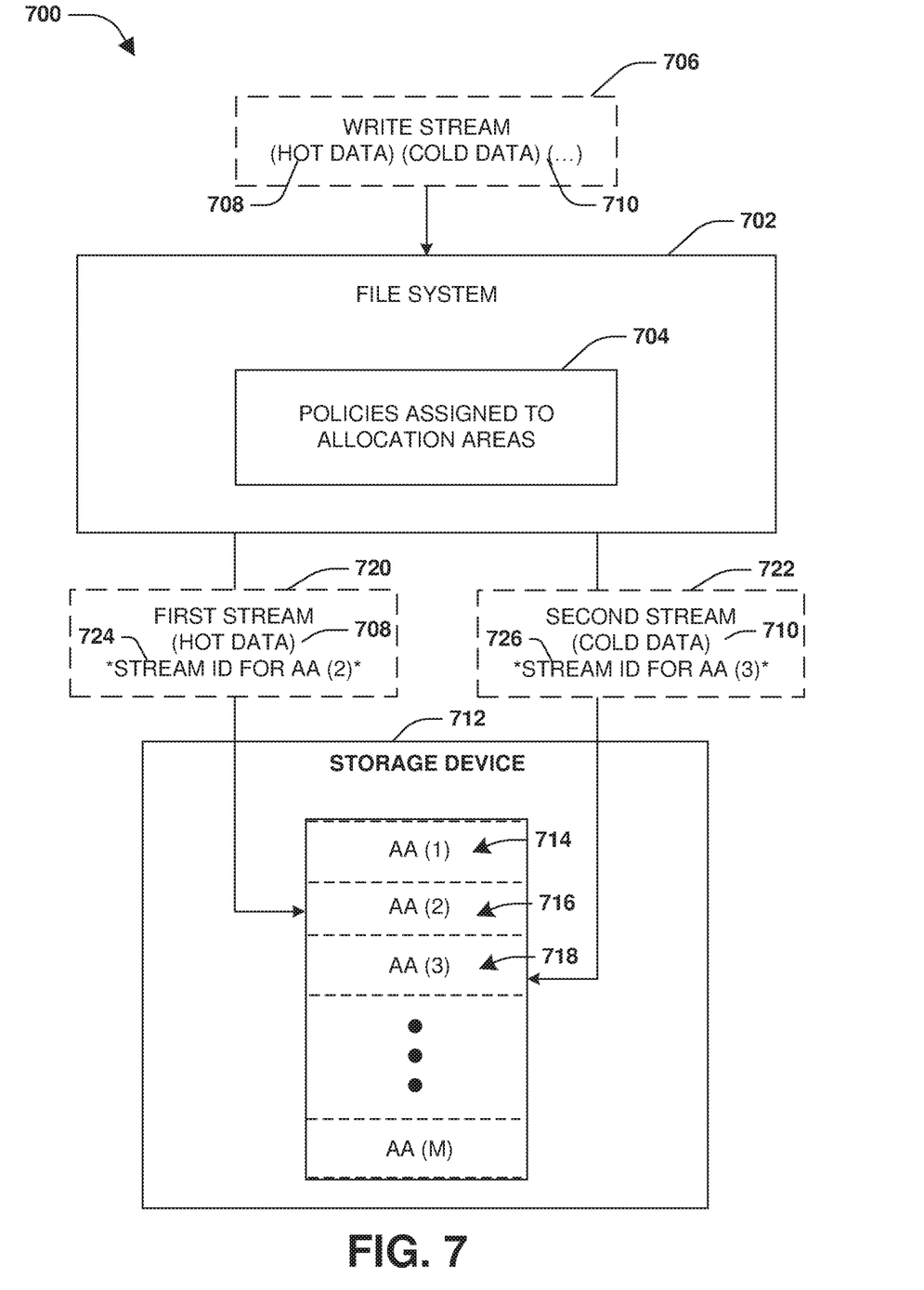
FIG. 7 is a component block diagram illustrating an exemplary computing device for selectively storing data into allocation areas using streams.

FIG. 7 illustrates an example of a system 700 for selectively storing data into allocation areas using streams. A file system 702 or any other hardware or software module may define one or more allocation areas within a storage device 712. For example, a first allocation area 714 may be defined for a first block range (e.g., a first range of virtual block numbers) of the storage device 712. A second allocation area 716 may be defined for a second block range (e.g., a second range of virtual block numbers) of the storage device 712. A third allocation area 718 may be defined for a third block range (e.g., a third range of virtual block numbers) of the storage device 712. In this way, a plurality of allocation areas may be defined within the storage device 712 and/or across other storage devices.

The file system 702 may negotiate with the storage device 712 to determine stream identifiers that the file system 702 will use to tag streams of data. A stream identifier will be an indicator to the storage device 712 that data of a stream tagged with the stream identifier is to be processed (e.g., stored) within a corresponding allocation area. For example, a first stream identifier may be specified for the first allocation area 714. A second stream identifier 724 may be specified for the second allocation area 716. A third stream identifier 726 may be specified for the third allocation area 718.

The file system 702 may assign policies 704 to allocation areas. For example, a policy may be assigned to the second allocation area 716 and/or the third allocation area 718. The policy may specify that hot data (e.g., data accessed at a frequency greater than a threshold) is to be stored within the second allocation area 716 and that streams of hot data are to be tagged with the second stream identifier 724 specified for the second allocation area 716. In this way, hot data will be stored/contained within the second allocation area 716 and not in other allocation areas. Thus, fragmentation resulting from frequent access to the hot data may be contained within the second allocation area 716 and will not introduce additional fragmentation to other allocation areas.

The policy may specify that cold data (e.g., data accessed at a frequency below the threshold) is to be stored within the third allocation area 718 and that streams of cold data are to be tagged with the third stream identifier 726 specified for the third allocation area 718. In this way, cold data will be stored/contained within the third allocation area 718 and not in other allocation areas. Thus, garbage collection techniques and/or other techniques that move valid data from destination cells to free cells so that new data can be written to those destination cells are not needlessly moving the cold data around.

Allocation areas may be sorted into a sorted set of allocation areas. The allocation areas may be sorted based upon the policies 704, available free space, and/or other sorting criteria. For example, a policy may specify that randomly accessed data can be stored within the second allocation area 716 and the third allocation area 718. When a write stream of randomly accessed data is received, allocation areas may be dynamically sorted in relation to a current scenario of storing randomly accessed data within the storage device 712. The first allocation area 714 may be ranked below the second allocation area 716 and below the third allocation area 718 based upon the policy specifying that the second allocation area 716 and the third allocation area 718 but not the first allocation area 714 is to be used for storing randomly accessed data. The second allocation area 716 may be ranked higher than the third allocation area 718 based upon the second allocation area 716 having more available free space than the third allocation area 718.

The file system 702 may receive a write stream 706. The write stream 706 may comprise hot data 708 (e.g., data accessed at a frequency greater than a threshold), cold data 710 (e.g., data accessed at a frequency below the threshold), and/or data having other characteristics. The file system 702 may utilize the policies 704 to determine (e.g., to sort allocation areas and select a highest ranked allocation area) that the second allocation area 716 is to be used for storing the hot data 708. The file system 702 may assign the hot data 708 to a first stream 720. The file system 702 may tag the first stream 720 with the second stream identifier 724 of the second allocation area 716. In this way, the first stream 720 is provided to the storage device 712. The storage device 712 will process the hot data 708 of the first stream 720 using the second allocation area 716 based upon the first stream 720 being tagged with the second stream identifier 724.

The file system 702 may utilize the policies 704 to determine (e.g., to sort allocation areas and select a highest ranked allocation area) that the third allocation area 718 is to be used for storing the cold data 710. The file system 702 may assign the cold data 710 to a second stream 722. The file system 702 may tag the second stream 722 with the third stream identifier 726 of the third allocation area 718. In this way, the second stream 722 is provided to the storage device 712. The storage device 712 will process the cold data 710 of the second stream 722 using the third allocation area 718 based upon the second stream 722 being tagged with the third stream identifier 726.

Figure 8:
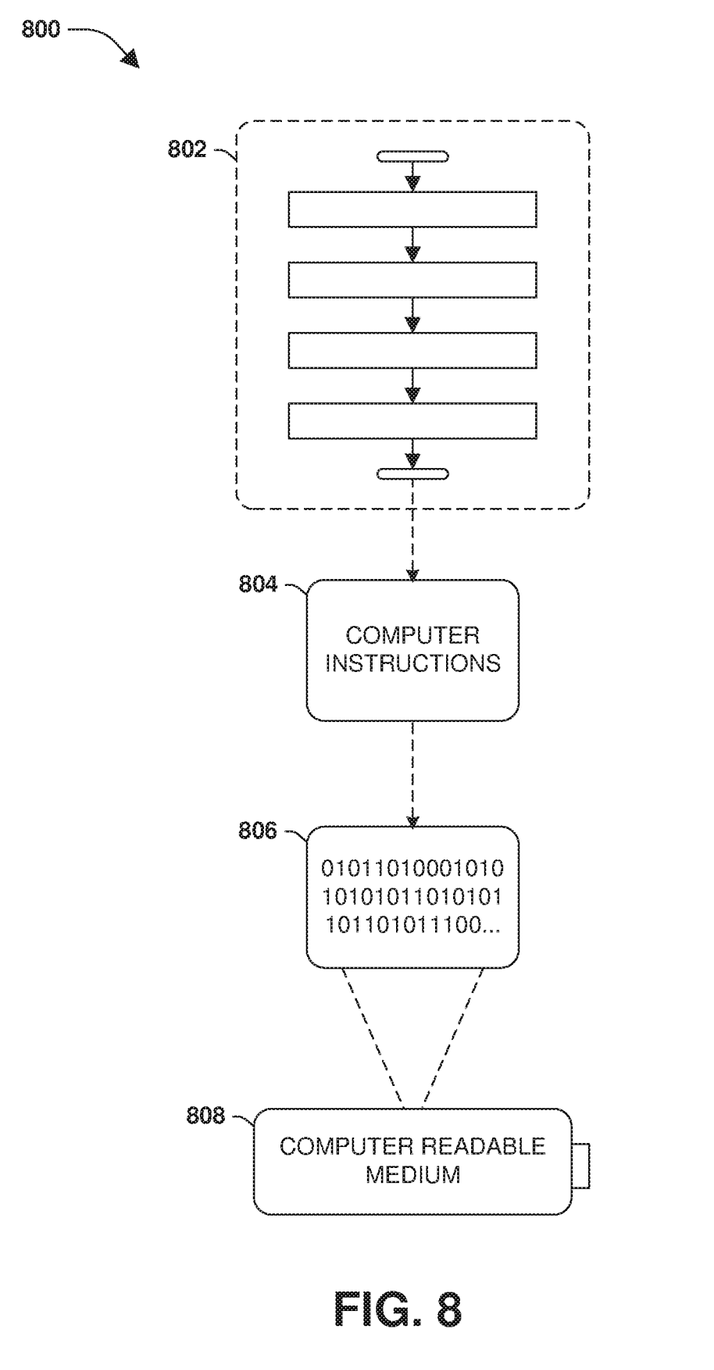
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises a processor-executable computer instructions 804 configured to operate according to one or more of the principles set forth herein. In some embodiments, the processor-executable computer instructions 804 are configured to perform a method 802, such as at least some of the exemplary method 300 of FIG. 3 and/or at least some of the exemplary method 600 of FIG. 6, for example. In some embodiments, the processor-executable computer instructions 804 are configured to implement a system, such as at least some of the exemplary system 400 of FIG. 4, at least some of the exemplary system 500 of FIG. 5, and/or at least some of the exemplary system 700 of FIG. 7 for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
utilizing a policy to dynamically sort a set of allocation areas of a storage to create a first sorted set of allocation areas eligible to write first data to the storage and a second sorted set of allocation areas eligible to write second data to the storage,
selectively storing the first data into a first allocation area of the first sorted set of allocation areas based upon the first allocation area having a first sorted rank above a first threshold; and
selectively storing the second data into a second allocation area of the second sorted set of allocation areas based upon the second allocation area having a second sorted rank above a second threshold.

2. The method of claim 1, wherein the utilizing the policy comprises:
sorting the set of allocation areas using sorting criteria corresponding to the policy, amounts of available free space of each allocation area of the set of allocation areas, and a current scenario for storing data.

3. The method of claim 1, comprising:
dynamically sorting and resorting the set of allocation areas on-the-fly as write streams are received by a file system for processing.

4. The method of claim 1, comprising:
defining the policy to specify that user data is to be stored within the first allocation area and that metadata is to be stored within the second allocation area based upon the user data and the metadata having different access patterns.

5. The method of claim 1, wherein the selectively storing the first data comprises:
sending the first data to the storage using a first stream tagged with a first stream identifier associated with the first allocation area.

6. The method of claim 5, wherein the first threshold corresponds to a highest ranked allocation area, and wherein the method further comprises:
selecting the first allocation area based upon the first allocation area being assigned the first sorted rank having a highest sorted rank than other allocation areas of the set of allocation areas.

7. The method of claim 1, wherein the selectively storing the second data comprises:
sending the second data to the storage using a second stream tagged with a second stream identifier associated with the second allocation area.

8. The method of claim 7, wherein the policy specifies that the second stream identifier is associated with the second allocation area.

9. The method of claim 1, comprising:
redefining the first allocation area to increase available storage space of the first allocation area based upon a determination that the first allocation area has an amount of free space below a storage space threshold.

10. The method of claim 1, comprising:
defining the first allocation area and the second allocation area as integer multiples of erase block units of a storage device.

11. A non-transitory machine readable medium comprising instructions for performing a method, which when executed by a machine, causes the machine to:
dynamically sort a set of allocation areas of a storage to create a first sorted set of allocation areas eligible to write first data to the storage and a second sorted set of allocation areas eligible to write second data to the storage, selectively store the first data into a first allocation area of the first sorted set of allocation areas based upon the first allocation area having a first sorted rank higher than sorted ranks assigned to other allocations areas within the first sorted set of allocation areas; and selectively store the second data into a second allocation area of the second sorted set of allocation areas based upon the second allocation area having a second sorted rank higher than sorted ranks assigned to other allocations areas within the second sorted set of allocation areas.

12. The non-transitory machine readable medium of claim 11, wherein the first allocation area and the second allocation area are comprised within a storage device of the storage.

13. The non-transitory machine readable medium of claim 11, wherein the first allocation area is comprised within a first storage device of the storage and the second allocation area is comprised within a second storage device of the storage.

14. The non-transitory machine readable medium of claim 11, wherein the instructions cause the machine to:
define a policy, used to dynamically sort the set of allocation areas, to specify that user data is to be stored within the first allocation area and that metadata is to be stored within the second allocation area based upon the user data and the metadata having different access patterns.

15. The non-transitory machine readable medium of claim 11, wherein the instructions cause the machine to:
send the first data to the storage using a first stream tagged with a first stream identifier associated with the first allocation area.

16. The non-transitory machine readable medium of claim 15, wherein a policy, used to dynamically sort the set of allocation areas, specifies that the first stream identifier is associated with the first allocation area.

17. The non-transitory machine readable medium of claim 11, wherein the instructions cause the machine to:
send the second data to the storage using a second stream tagged with a second stream identifier associated with the second allocation area.

18. A computing device comprising:
a memory comprising machine executable code; and
a processor coupled to the memory, the processor configured to execute the machine executable code to cause the processor to:
utilize a policy to dynamically sort a set of allocation areas of storage to create a first sorted set of allocation areas eligible to store first data to write to the storage and a second sorted set of allocation areas eligible to store second data to write to the storage,
selectively store the first data into a first allocation area of the first sorted set of allocation areas based upon the first allocation area having a first sorted rank higher than sorted ranks assigned to other allocations areas within the first sorted set of allocation areas; and
selectively store the second data into a second allocation area of the second sorted set of allocation areas based upon the second allocation area having a second sorted rank higher than sorted ranks assigned to other allocations areas within the second sorted set of allocation areas.

19. The computing device of claim 18, wherein the machine executable code causes the processor to:
redefine the first allocation area to increase available storage space of the first allocation area based upon a determination that the first allocation area has an amount of free space below a threshold.

20. The computing device of claim 18, wherein the machine executable code causes the processor to:
define the first allocation area and the second allocation area as integer multiples of erase block units of a storage device.

* * * * *